(12) United States Patent
Hio

(10) Patent No.: US 7,982,721 B2
(45) Date of Patent: Jul. 19, 2011

(54) VIDEO SIGNAL OUTPUT DEVICE AND OPERATION INPUT PROCESSING METHOD

(75) Inventor: Akimitsu Hio, Tokyo (JP)

(73) Assignee: Sony Corporation (JP)

( * ) Notice: Subject to any disclaimer, the term of this patent is extended or adjusted under 35 U.S.C. 154(b) by 837 days.

(21) Appl. No.: 11/998,739

(22) Filed: Nov. 30, 2007

(65) Prior Publication Data

US 2008/0136790 A1    Jun. 12, 2008

(30) Foreign Application Priority Data

Dec. 12, 2006   (JP) ................ P2006-334412

(51) Int. Cl.
*G06F 3/041*   (2006.01)
(52) U.S. Cl. ..................................... 345/173
(58) Field of Classification Search ............ 345/90, 345/173, 156, 169; 361/681
See application file for complete search history.

(56) References Cited

U.S. PATENT DOCUMENTS

| | | | |
|---|---|---|---|
| 7,433,179 B2* | 10/2008 | Hisano et al. | 361/679.27 |
| 2006/0152497 A1 | 7/2006 | Rekimoto | |
| 2006/0284858 A1 | 12/2006 | Rekimoto | |
| 2007/0016868 A1* | 1/2007 | Nurmi | 715/738 |
| 2007/0118281 A1* | 5/2007 | Adam et al. | 701/211 |

FOREIGN PATENT DOCUMENTS

JP        62-242220 A    10/1987

* cited by examiner

*Primary Examiner* — Quan-Zhen Wang
*Assistant Examiner* — Calvin C Ma
(74) *Attorney, Agent, or Firm* — Lerner, David, Littenberg, Krumholz & Mentlik, LLP

(57) ABSTRACT

A video signal output device is disclosed. The device includes: a video signal generation section that generates an output video signal for screen display; an operation input section that detects a physical touch position and a pressure with respect to an input surface, and in accordance with a detection result, generates information about the touch position and information about the pressure for use each as an operation signal; and a control section that controls, in accordance with the operation signals coming from the operation input section, the video signal generation section to change display contents of the output video signal. In the device, while the output video signal for list display of a plurality of images is being generated, the information about the touch position and the information about the pressure are processed as the operation signal for image selection and the operation signal related to the images, respectively.

3 Claims, 11 Drawing Sheets

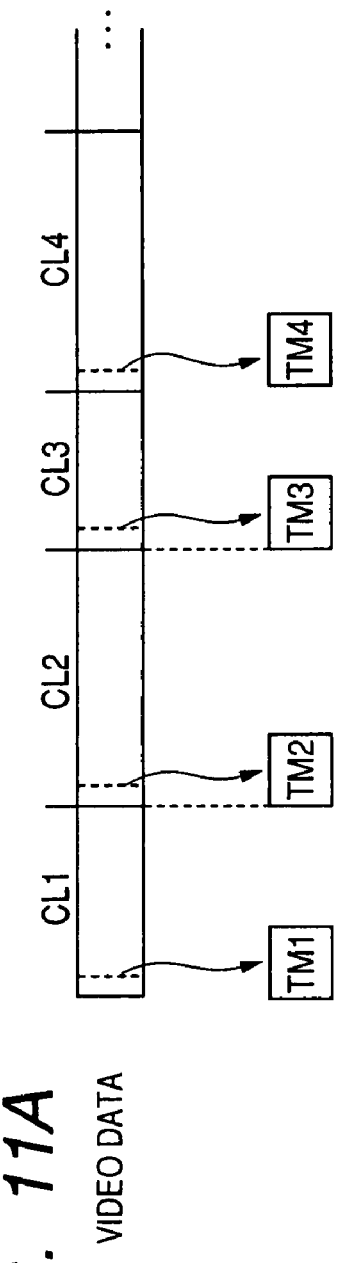
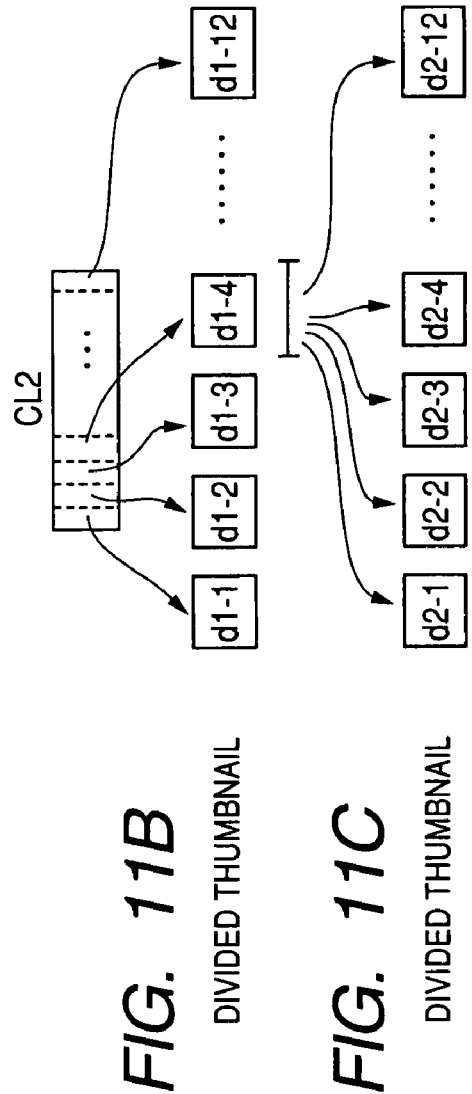
FIG. 11A
VIDEO DATA
FIG. 11B
DIVIDED THUMBNAIL
FIG. 11C
DIVIDED THUMBNAIL

VIDEO SIGNAL OUTPUT DEVICE AND OPERATION INPUT PROCESSING METHOD

CROSS-REFERENCE TO RELATED APPLICATIONS

The present application claims priority from Japanese Patent Application No. JP 2006-334412, filed in the Japanese Patent Office on Dec. 12, 2006, the entire content of which is incorporated herein by reference.

BACKGROUND OF THE INVENTION

1. Field of the Invention

The present invention relates to a video signal output device that outputs a video signal for display on a display device, i.e., monitor display, being configured as a piece therewith or separately therefrom, and an operation input processing method of handling user inputs made with respect to a display video.

2. Description of the Related Art

With a device such as recording and reproducing device for recording and reproducing video data to/from an optical disk exemplified by DVD (Digital Versatile Disc) and Blu-ray Disc (Registered Trademark), the video data recorded on the optical disk can be displayed in the form of a list. Such a display is made on a monitor display device configured as a piece with the recording and reproducing device or separately therefrom with a connection, and is known as a thumbnail list.

In such a recording and reproducing device, stream video data recorded on a recording medium, e.g., optical disk, is managed in the unit of video data, which is referred to as clip. A clip is a unit indicating video data of a range from a start point of video imaging to a stopping point thereof.

When video data is recorded on an optical disk in the unit of a clip, the video contents of each of the clips are converted into thumbnail images, which are displayed in the form of a list. Note that the thumbnail images may be those each reduced in frame size for data of any typical image in each of the clips so that the clip contents can be displayed.

As such, with a list display of thumbnail images each showing any typical image contents in each of clips with a smaller frame size, a user can acknowledge with ease the video contents in the clips recorded on an optical disk, and can make use thereof for reproduction and editing.

SUMMARY OF THE INVENTION

With a list display of thumbnail images, selecting any thumbnail image will reproduce a clip corresponding thereto, and such an operation has been known.

As an example, with a list display of thumbnail images, a user operates any predetermined operation key, jog dial, and others to select any thumbnail image. In response to such an operational input, the device side accordingly reproduces a clop corresponding to the selected thumbnail image.

As such, a list display of thumbnail images has been used not only simply to check the contents of each clip but also to select and reproduce any of the clips using the thumbnail images displayed in the form of a list. But still there is a demand for making more effective use of the list display of thumbnail images.

The demand is of wanting to check the video contents with a better view with a size increase of the thumbnail images, wanting to check more in detail the video contents of any one specific clip while the video contents are displayed by a plurality of thumbnail images instead of only one thumbnail image as in the previous technology, and more.

To meet such a demand, however, the recording and reproducing device and others are required to include a plurality of operation pieces such as keys and jog dial for various types of operations. If with a larger number of such operation pieces, a user may confuse what operation piece he or she is supposed to operate, and the keys may be densely packed and cause a difficulty in operating the operation pieces.

As such, there is thus a concern about the possible reduction of usability if various many types of functions are additionally provided for a list display of thumbnail images, and if some more operation pieces are provided therefor.

It is thus desirable to provide more various functions for a list display of images, and to make user operation required to utilize such functions intuitively easy to understand.

According to an embodiment of the present invention, there is provided a video signal output device, including: a video signal generation section that generates an output video signal for screen display; an operation input section that detects a physical touch position and a pressure with respect to an input surface, and in accordance with a detection result, generates information about the touch position and information about the pressure for use each as an operation signal; and a control section that controls, in accordance with the operation signals coming from the operation input section, the video signal generation section to change display contents of the output video signal. In the device, while the video signal generation section is generating the output video signal for list display of a plurality of images, the control section processes the information about the touch position as the operation signal for image selection, and processes the information about the pressure as the operation signal related to any of the images being a result of selection.

In the device, the operation input section also detects a physical touch area with respect to the input surface, and in accordance with a detection result, generates, for use as the operation signal, information about the touch area together with the information about the touch position and the information about the pressure, and while the video signal generation section is generating the output video signal for list display of a plurality of images, the control section processes the information about the pressure and the information about the touch area each as the operation signal related to the image being the result of selection.

Also in the device, while the video signal generation section is generating the output video signal for list display of a plurality of images, the control section processes the information about the pressure as the operation signal for a command of increasing the size of the image being the result of selection.

Also in the device, while the video signal generation section is generating the output video signal for list display of a plurality of thumbnail images in the unit of predetermined video data, e.g., clip, the control section processes the information about the pressure and the information about the touch area each as the operation signal related to display of divided thumbnail images being a result of dividing any of the units of video data corresponding to any of the thumbnail images being a result of selection.

According to another embodiment of the present invention, there is provided an operation input processing method, including the steps of: detecting a physical touch position and a pressure with respect to an input surface of an operation input section; processing information about the touch position for use as an operation signal for image selection on a screen on which a plurality of images are displayed in the form of a list; and processing information about the pressure for use as another operation signal related to any of the images being a result of the image selection.

With such embodiments of the invention, provided is an operation input section that subjects an input surface to detection of a physical touch position, a pressure, and a touch area. In accordance with the detection result, the operation input section generates information about the physical touch position, the pressure, and the touch area each for use each as an operation signal. Such an operation input section includes a plane portion for use as an input surface as is known as a touch pad.

A user touches the input surface with his or her finger, for example, and any differences of the user's touch made on the input surface are each used as operation information, e.g., differences of a touch position, differences of a pressure at the time of the touch, differences of a touch area depending on whether the touch is made by the user's finger tip or finger belly.

Such information is used as an operation signal for displaying a plurality of images, e.g., a list display of thumbnail images, and by the operation input section such as touch pad, various types of operations are made for display of the images.

According to the embodiments of the invention, with provision of the operation input section such as touch pad, various types of operations are enabled with respect to a plurality of images displayed in the form of a list, i.e., operation inputs varying in type can be made intensively thereby for the list display. As such, even if the operation functions are extended for the list display, the operation input section can solely handle various operations needed therefor. There thus is no more need to include a large number of operation pieces, thereby enabling to make effective use, in terms of area, of the operation panel of the device with easy-to-use designing.

Moreover, making various operations only through the operation input section with the input surface allows a user's intuitive operation.

As such, the versatility of the screen displaying images in the form of a list can be achieved with satisfactory usability.

BRIEF DESCRIPTION OF THE DRAWINGS

FIGS. 11A to 11C are each a diagram for illustrating thumbnails and divided thumbnails in the embodiment.

DESCRIPTION OF THE PREFERRED EMBODIMENTS

In the below, described are a video signal output device and an operation input processing method in an embodiment of the invention in the following order with an exemplary recording and reproducing device 1 that performs recording and reproduction of video data to/from an optical disk 90. The recording and reproducing device 1 is an embodiment of the video signal output device according to the invention, and the procedure to be executed by the recording and reproducing device 1 is an embodiment of the operation input processing method according to the invention.

Figure 1:
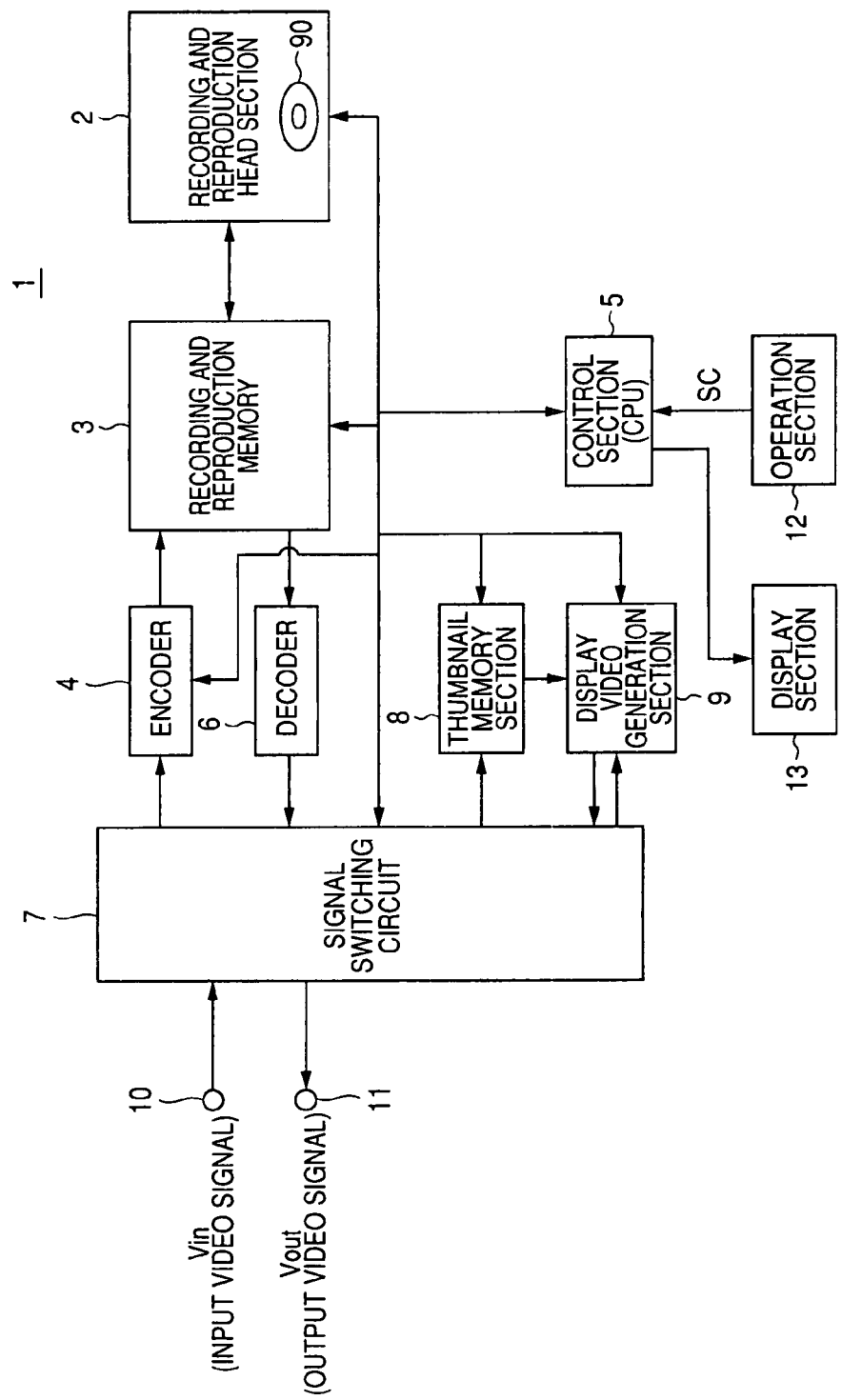
FIG. 1 is a block diagram showing a recording and reproducing device of an embodiment of the invention.

1. Exemplary Configuration of Recording and Reproducing Device
2. Touch Pad
3. Basic Operation
4. Extended Operation Example I
5. Extended Operation Example II 1. Exemplary Configuration of Recording and Reproducing Device FIG. 1 shows an exemplary configuration of the recording and reproducing device 1.

The recording and reproducing device 1 is configured to include a recording and reproduction head section 2, a recording and reproduction memory 3, an encoder 4, a control section 5, a decoder 6, a signal switching circuit 7, a thumbnail memory section 8, a display video generation section 9, a video input section 10, a video output section 11, an operation section 12, and a display section 13.

This recording and reproducing device 1 issues various types of commands and operation signals SC with respect to the control section 5 in response to a user (operator) operation. The user operation is made using a device connected to the recording and reproducing device 1, e.g., edit command device and operation device (both not shown), or using the operation section 12 provided to the recording and reproducing device 1.

The control section 5 is configured by a CPU (Central Processing Unit). This control section 5 controls over the components in response to commands coming from any external device and an operation signal SC coming from the operation section 12. Through such control, processes are executed for operations with respect to the optical disk 90, i.e., recording, reproduction, and editing, and for display of thumbnail images in the form of a list, which will be described later.

The recording and reproduction head section 2 performs data writing and reading to/from the loaded optical disk 90. That is, the recording and reproduction head section 2 is provided with various mechanisms, e.g., spindle mechanism that rotate-drives the optical disk 90, pickup mechanism that performs information writing and reading by exposing the optical disk 90 with laser radiation, servo mechanism that controls the operation of the pickup mechanism and that of the spindle mechanism, and others.

Using these mechanisms, the recording and reproduction head section 2 performs writing and reading of video data.

The recording and reproduction memory 3 is used to buffer the video data when the recording and reproduction head section 2 performs writing and reading thereof to/from the optical disk 90.

At the time of reproduction of data, the recording and reproduction memory 3 temporarily stores therein video data being information read from the optical disk 90 by the recording and reproduction head section 2. The video data stored temporarily as such is read at any predetermined timing for supply to the decoder 6.

At the time of recording of data, the video data coming from the encoder 4 is temporarily stored in the recording and reproduction memory 3. The video data stored temporarily as such is read at any predetermined timing, and is supplied to the recording and reproduction head section 2 for recording onto the optical disk 90.

The video input section 10 is provided with a video signal, i.e., input video signal Vin, for recording onto the optical disk 90.

From the video output section 11, a video signal, i.e., output video signal Vout, is forwarded to a monitor display device (not shown) connected thereto. The output video signal Vout is used for display of videos reproduced from the optical disk 90 and thumbnail images in the form of a list.

The signal switching circuit 7 performs switching of a video signal path among the components, i.e., the video input section 10, the video output section 11, the encoder 4, the decoder 6, the thumbnail memory section 8, and the display video generation section 9. This switching of signal path is performed based on a command coming from the control section 5.

For example, for recording of data, the switching of signal path is so performed that the input video signal Vin from the video input section 10 is directed to the encoder 4.

For reproduction of data, the switching of signal path is so performed that the video signal coming from the decoder 6 is output from the video output section 11 as the output video signal Vout.

For display of thumbnail images in the form of a list that will be described later, the switching of signal path is so performed that a video signal generated as a list image by the display video generation section 9 is output as the output video signal Vout.

For reading of thumbnail data to the thumbnail memory section 8, the switching of signal path is so performed that a video signal from the decoder 6 is supplied to the thumbnail memory section 8.

The encoder 4 goes through an encoding process so that an incoming video signal is recorded onto the optical disk 90. That is, for recoding onto the optical disk 90, an input video signal Vin is directed to the encoder 4 via the signal switching circuit 7. In response, the encoder 4 subjects the input video signal Vin to the encoding process so that video data being the encoding result is supplied to the recording and reproduction memory 3. This video data stored in the recording and reproduction memory 3 as such after encoding is read at a predetermined timing, and is directed to the recording and reproduction head section 2. As such, the video data is recorded onto the optical disk 90.

Note that the optical disk 90 is recorded not only with normal video data but also with thumbnail data in clips. If this is the case, the encoder 4 applies a size reduction process to specific frame data, thereby generating thumbnail data. The frame data is typical image data of each of the clips, and the resulting thumbnail data is supplied to the recording and reproduction memory 3 as data for recording onto the optical disk 90.

At the time of reproduction of data, the decoder 6 is provided with the video data at a predetermined timing. The video data here is the one read from the optical disk 90 by the recording and reproduction head section 2, and then stored in the recording and reproduction memory 3. To the video data read from the optical disk 90 as such, the decoder 6 applies a decoding process, thereby deriving a reproduced video signal. The decoding process here is the one contrary to the encoding process executed at the time of recording. The resulting video signal is forwarded, as an output video signal Vout, from the video output section 11 via the signal switching circuit 7.

The thumbnail memory section 8 serves as a cache memory for thumbnail data.

For the video data recorded and managed on the optical disk 90 in the unit of a clip, the thumbnail memory section 8 captures and stores therein thumbnail data of each of the clips.

The display video generation section 9 generates a video signal for use to display images on a monitor display device connected thereto. The images include a list image of thumbnail images, a menu image, management images varying in type, and others.

For example, using thumbnail data stored in the thumbnail memory section 8 for each of the clips, a video signal is generated as a list image of thumbnail images.

Such a video signal is forwarded as an output video signal Vout from the video output section 11 via the signal switching circuit 7, and then is displayed on the monitor display device.

The display video generation section 9 goes through a process based on a command coming from the control section 5. The process is of changing the display contents of a list image of thumbnail images, increasing the size of thumbnail images, dividing the thumbnail images for display that will be described later, and others. As a result of such a process, generated are video signals all for display use, and any predetermined display is made on the monitor display device.

The display section 13 is disposed to a front panel of the recording and reproducing device 1, for example, and makes various displays, e.g., various operation states, operation modes, and operation guideline under the control of the control section 5.

The operation section 12 is provided with various types of operation pieces, and forwards an operation signal SC to the control section 5. The operation signal Sc is the one being the result of a user's operation using any of the operation pieces.

Figure 2:
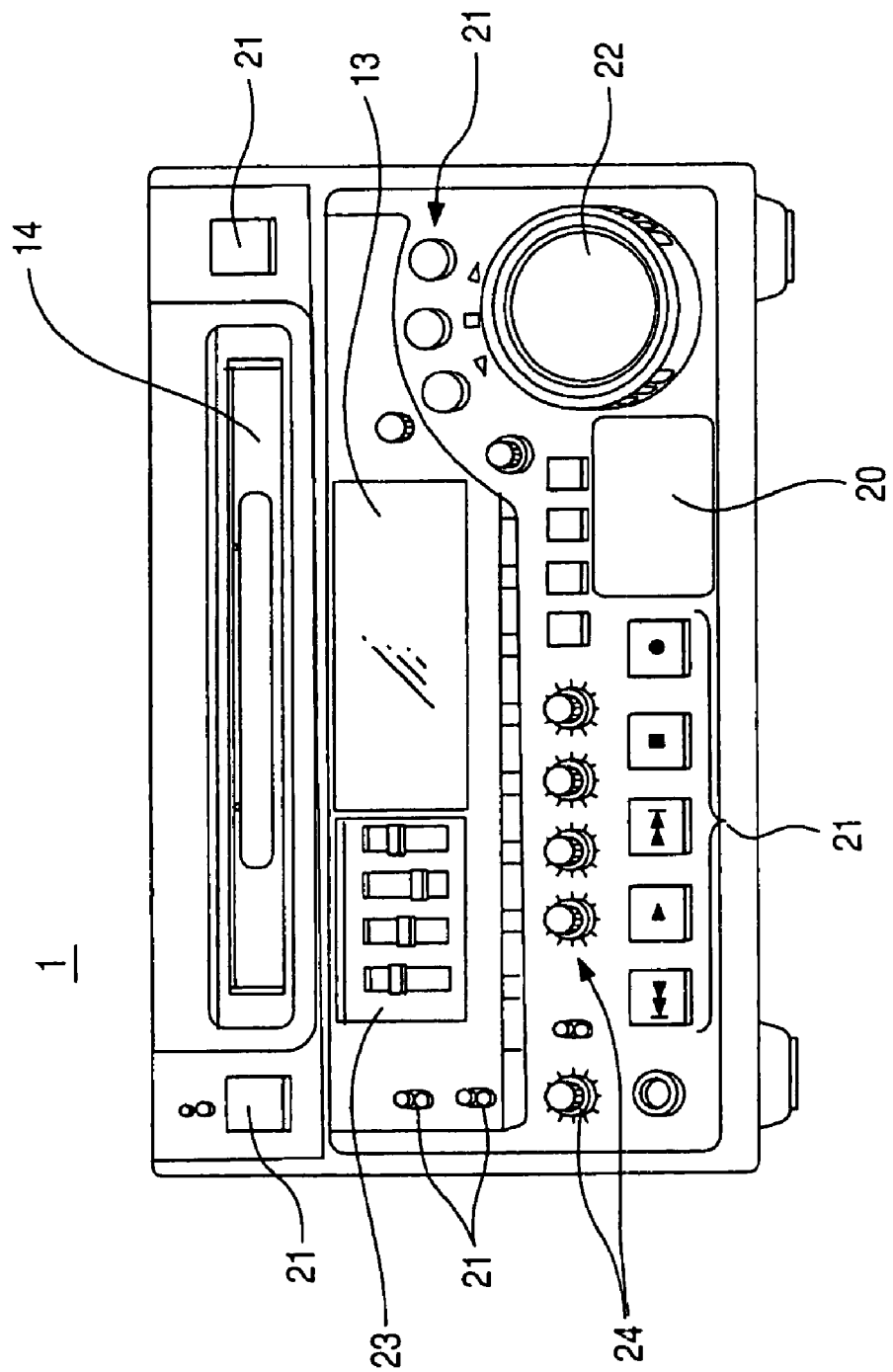
FIG. 2 is a diagram for illustrating a front panel of the recording and reproducing device of the embodiment.

FIG. 2 shows an exemplary front panel of the recording and reproducing device 1. As shown in the drawing, on the front panel side of the recording and reproducing device 1, provided are the display section 13, a disk insertion section 14, and various operation pieces (20, 21, 22, and 23).

The optical disk 90 is loaded to the disk insertion section 14, and ejected therefrom.

The display section 13 is disposed as shown in FIG. 2, and displays thereon various types of information for a user who is operating the device.

The operation section 12 of FIG. 1 is configured to include the touch pad 20, the operation key 21, the jog dial 22, the slide operation section 23, a rotation operation section 24, and others, which are shown in FIG. 2 as operation pieces. These components are each assigned predetermined operation details.

The operation section 12 forwards, as an operation signal SC, the user's operation made through these operation pieces to the control section 5.

2. Touch Pad

In this example, the operation section 12 is provided with the touch pad 20, and operating the touch pad 20 allows execution of various types of operations with respect to a list image of thumbnail images.

Figure 3:
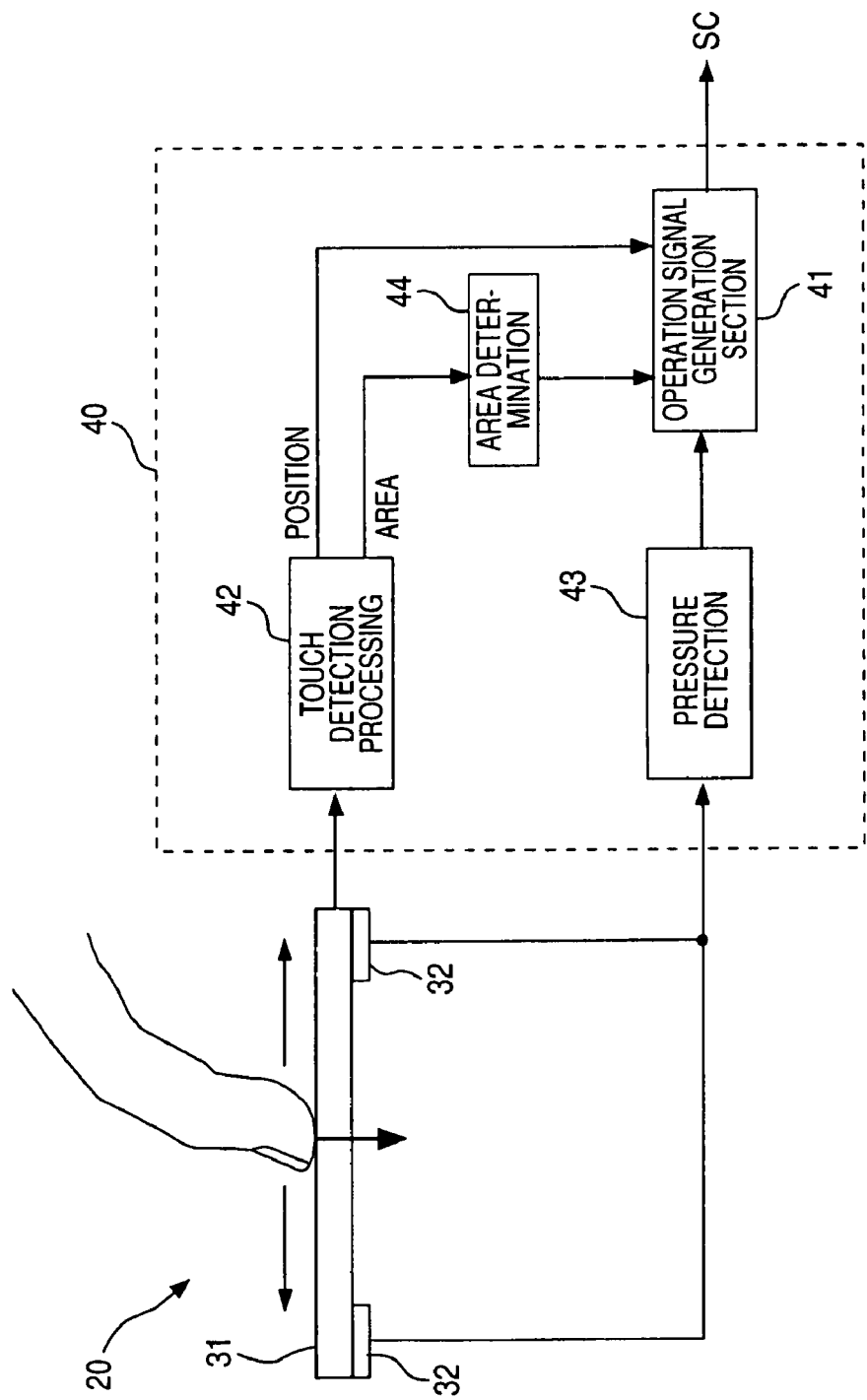
FIG. 3 is a diagram for illustrating the configuration of a touch pad of the embodiment.

FIGS. 3 and 4 each show an exemplary configuration of the touch pad 20 in the operation section 12.

As shown in FIG. 3, the touch pad 20 in the operation section 12 is so configured as to include the touch pad itself 20 and a detection signal processing section 40. The touch pad 20 is configured to include a touch sensor section 31 and a pressure sensor section 32, and in accordance with the detection outputs from the touch sensor section 31 and the pressure sensor section 32, the detection signal processing section 40 outputs an operation signal SC.

The touch sensor section 31 is used as a touch sensor, a touch pad, or a touch panel, and detects any physical touch of a finger or others made to the surface, i.e., input surface. This touch detection is made by a capacitive mode, a resistive mode, and others. This touch sensor section 31 is capable of at least detecting the position and area touched by a finger or others.

The pressure sensor section 32 detects a pressure of any physical touch, i.e., detects the depression force when a finger or others depress the input surface for operation. The pressure sensor section 32 is referred also to as pressure-sensitive sensor or pressure detection element, and is configured using a piezoelectric element, a pressure-electrical resistance conversion element, and others.

In FIG. 3 example, the surface of the plate-like touch sensor section 31 is configured to serve as the input surface of the touch pad 20, and the pressure sensor section 32 is disposed at four corners or others on the underside of the touch sensor section 31 for supporting the plate-like touch sensor section 31.

With this configuration, with a depression operation by a finger or others touching the surface of the touch sensor section 31 serving as the input surface, the depression force is applied to the pressure sensor section 32 via the touch sensor section 31, and the depression force of the finger or others is detected by the pressure sensor section 32.

Note that the configuration of the touch pad 20 is surely not restrictive to that in FIG. 3 example, and alternatively, the pressure sensor section may be configured by the plate-like touch sensor section being supported by a spacer or others at four corners, for example, and by the underside of the touch sensor section being attached with a strain gage or others. When such a plate-like touch sensor section is depressed by a finger or others, any strain observed thereto may be detected using a strain gage or others, thereby detecting the depression force.

The detection signal processing section 40 is configured to include an operation signal generation section 41, a touch detection processing section 42, a pressure detection section 43, and an area determination section 44.

The touch detection processing section 42 is connected to the touch sensor section 31, and detects a position and area touched by a finger or others for processing, thereby outputting a touch position information signal and a touch area information signal both being electric signals.

The pressure detection section 43 is connected to the pressure sensor section 3, and detects any applied pressure, i.e., the pressure force by a finger or others, thereby outputting an electric pressure detection signal.

The area determination section 44 compares the touch area information signal provided by the touch detection processing section 42 with a threshold value of a predetermined area, and determines which is larger than the other. Based on the determination result, the area determination section 44 outputs a determination signal indicating whether the touch area is large or not. The determination signal about the size of the touch area is, specifically, a signal for use to determine whether the touch is made by a finger tip or a finger belly.

Figure 4A:
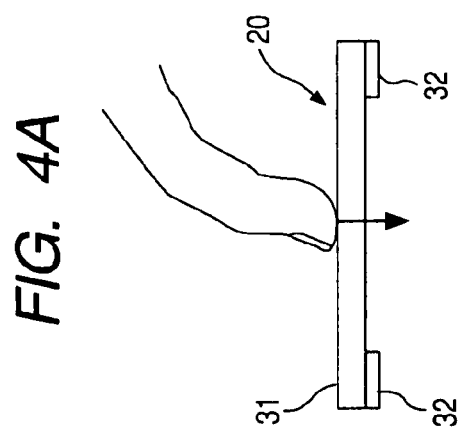
FIGS. 4A to 4D are each a diagram for illustrating how to detect a touch area of the touch pad of the embodiment.
Figure 4B:
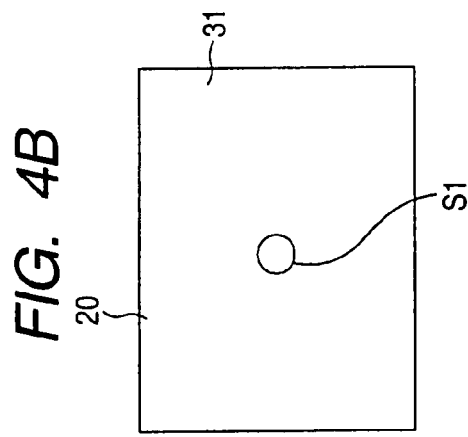

FIGS. 4A to 4D each show an exemplary input operation made by a finger or others with respect to the touch pad 20. Specifically, FIGS. 4A and 4B are respectively a schematic cross sectional view and a plane view when the input surface, i.e., surface of the touch sensor section 31, of the touch pad 20 is touched by the tip of a finger, i.e., with the finger tip directed straight downward. With such a touch, the area of the touch sensor section 31 touched by the finger tip is small as shown in FIG. 4B, i.e., area S1.

Figure 4C:
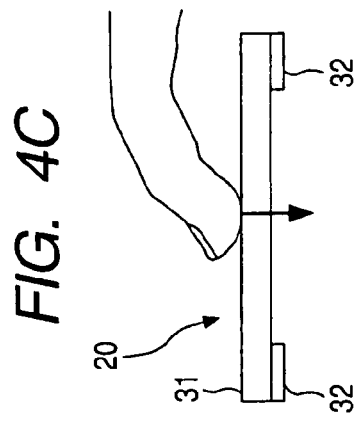
Figure 4D:
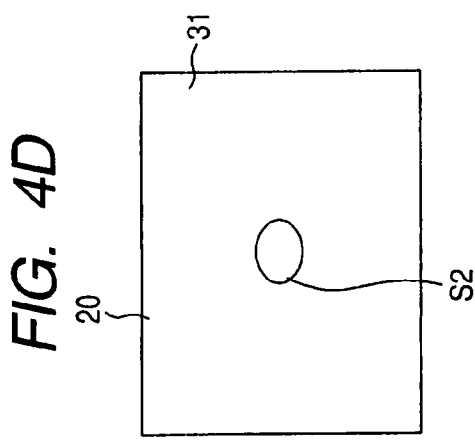

On the other hand, FIGS. 4C and 4D are respectively a schematic cross sectional view and a plane view when the input surface of the touch pad 20 is touched by the belly of a finger, i.e., with the finger belly placed down flat. With such a touch, the area of the touch sensor section 31 touched by the finger belly is large as shown in FIG. 4C, i.e., area S2.

That is, on the surface of the touch sensor section 31, the touch by a finger belly is larger in area than the touch by a finger tip, i.e., the area S2 is larger (wider) than the area S1, and these areas S1 and S2 can be explicitly distinguished from each other with a threshold value of any predetermined area. As such, a distinction can be made between the depression operation of the touch pad 20 with the user's finger tip directed straight downward and the depression operation thereof with the finger belly placed down flat. The determination signal of the area determination section 44 is information indicating which depression operation.

The operation signal generation section 41 generates an operation signal SC, and forwards the signal to the control section 5. This signal is generated based on the signals, i.e., the touch position information signal provided by the touch detection processing section 42, the determination signal provided by the area determination section 44, and the pressure detection signal provided by the pressure detection section 43. That is, the control section 5 is provided with information about the touch position, pressure, and finger tip/belly as the operation signal SC about the touch pad 20.

3. Basic Operation

In this example, various types of list display of thumbnail images are implemented through operation using the touch pad 20. In this example, described is the basic operation about the list display of thumbnail images. First of all, by referring to FIG. 11A, described is video data and thumbnail images recorded on the optical disk 90.

FIG. 11A schematically shows video data recorded on the optical disk 90. The video data is managed in the unit of a clip, and in FIG. 11A, the clips are denoted as CL1, CL2, CL3, CL4, and others. One clip is a cluster of successive video elements, which are video data captured in a time sequential manner, for example.

For each of the clips, a frame of a typical image data is determined. The typical image data is often selected in the range of a clip, i.e., within the lapse of ten seconds from the starting point, for example.

Assuming here is that typical image data is a frame located at a point of the lapse of three seconds from the starting point of each of the clips. In FIG. 11A, the frames of typical image data, e.g., the frames each located at a point of the lapse of three seconds, are indicated by the broken lines.

The data sharing the same image contents as the typical image data is used as thumbnail data. For example, data as a result of a size reduction process executed to the typical image data of each of the clips are thumbnail data in the drawing, i.e., TM1, TM2, TM3, TM4, and others.

These thumbnail data TM1, TM2, and others may not be necessarily recorded on the optical disk 90.

This is because even if the thumbnail data TM1 and TM2 are not recorded on the optical disk 90, whenever required for thumbnail display, for example, the thumbnail data can be generated from the typical image data.

For recording of the video data of the clips CL1, CL2, and others, onto the optical disk 90, if the thumbnail data TM1, TM2, and others are generated and recorded on the optical disk 90, the recorded thumbnail data TM1, TM2, and others may be read whenever thumbnail data is in need.

In this example, for list display of thumbnail images, the thumbnail data of each of the clips are stored in the thumbnail memory section 8.

After the optical disk 90 is loaded, when list display of thumbnail images is asked for the first time, data reading is performed with respect to the optical disk 90 so that the thumbnail data of each of the clips are stored in the thumbnail memory section 8. Thereafter, using the thumbnail data stored for each of the clips as such, the display video generation section 9 creates display data, i.e., video signal for a list display image of thumbnail images. When the video signal generated by the display video display section 9 for display use is supplied to the monitor display device as an output video signal Vout, the list display of thumbnail images is made for the first time.

At the time of storage of thumbnail data into the thumbnail memory section 8 as such, when the optical disk 90 is recorded with thumbnail data of each of the clips, for example, the recording and reproduction head section 2 is made to read the thumbnail data for supply to the thumbnail memory section 8 via the components, i.e., the recording and reproduction memory 3, the decoder 6, and the signal switching circuit 7. The thumbnail data is then stored in the thumbnail memory section 8.

On the other hand, when the optical disk 90 is not recorded with the thumbnail data, the recording and reproduction head section 2 is made to read the typical image data for each of the clips recorded on the optical disk 90. Thereafter, the frame data serving as the typical image data is supplied to the thumbnail memory section 8 via the components, i.e., the recording and reproduction memory 3, the decoder 6, and the signal switching circuit 7. In this case, for example, the thumbnail memory section 8 is provided with a generation processing section that generates thumbnail data after subjecting the typical image data to the size reduction process. That is, the thumbnail memory section 8 generates thumbnail data from the typical image data provided as such, and the resulting thumbnail data is stored therein.

As described above, for list display for the first time, for example, data reading is performed with respect to the optical disk 90 so that the thumbnail data is stored in the thumbnail memory section 8 for each of the clips. Based on the thumbnail data stored as such, the display data for list display use is created and output. As such, at the time of list display of thumbnail images for the first time, due to the necessity for reading access to the optical disk 90, it takes a relatively long time until the list display is made.

On the other hand, when the list display is asked for the second time and thereafter, the display data can be created on the display memory 9 using the thumbnail data stored in the thumbnail memory section 8 so that the list display can be made in a short time. This is because there is no need to perform data reading with respect to the optical disk 90 this time.

Figure 5A:
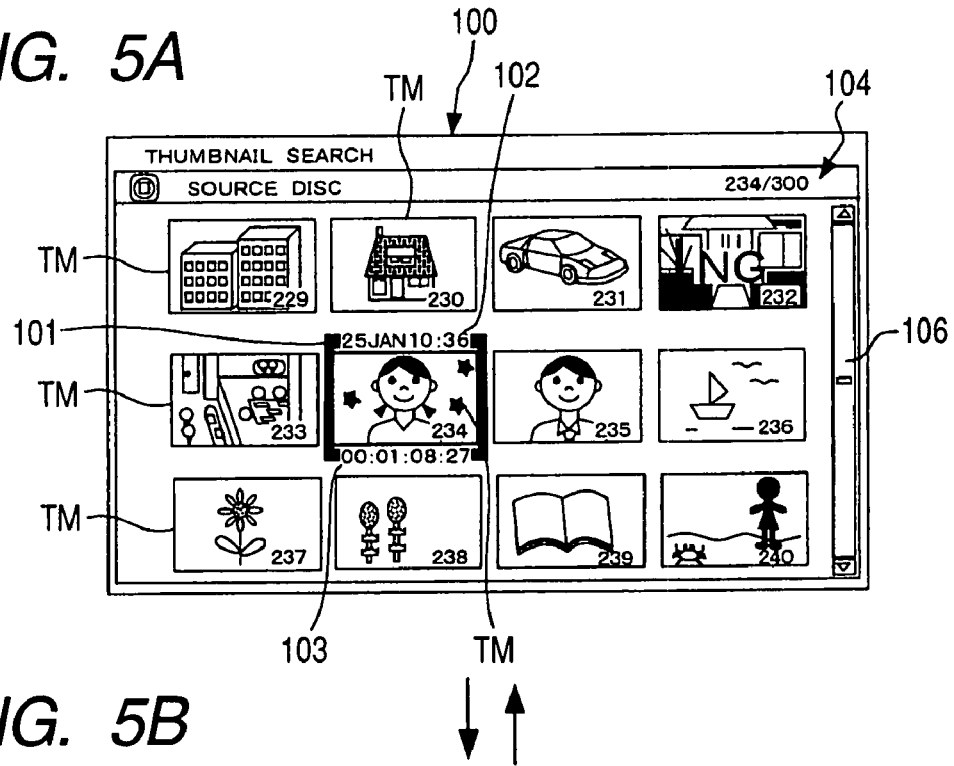
FIGS. 5A and 5B are diagrams for illustrating the basic operation with a list display of thumbnail images in the embodiment.

FIG. 5A shows a screen 100 of the monitor display device with the list display of thumbnail images thereon.

The screen 100 displays thereon 12 thumbnail images TM, for example. Assuming that the optical disk 90 is recorded with 300 clips, it means 300 thumbnail images TM can be displayed as thumbnail images for each of the clips. FIG. 5A shows the state that the screen displays thereon the thumbnail images TM of the clips from 229th to 240th.

Also on the screen 100, a cursor 101 is displayed for the thumbnail images TM to indicate which thumbnail image TM is being selected. For the thumbnail images TM being selected (or possibly for every thumbnail image TM), displayed are imaging time and date information 102 and a time code 103. The selected thumbnail image TM is also displayed with a clip number 104.

On the right side of the screen, a scroll bar 106 is displayed.

For such list display of thumbnail images, for example, a user can go through various types of operations using the touch pad 20.

In the below, terms of "tap", "long push" and "depression" are used for describing the operations.

The term of "tap" denotes the operation of tapping the touch pad 20 for a short time.

The term of "long push" denotes the operation of continuously touching the touch pad 20 for a fixed length of time.

The term of "depression" denotes the operation of depressing the touch pad 20 with some degree of force. The touch pad 20 has two detection modes of "vector detection mode" and "position detection mode", for example.

With the vector detection mode, detected is the movement direction of a finger touching the touch pad 20, i.e., direction of any change of touch position, and based on the detection result, the cursor 101 is moved on the screen 100. As such, with the vector detection mode, the cursor is moved as is with a general mouse, and the cursor 101 is displayed on the screen 100 before a finger touch on the touch pad 20.

With the position detection mode, the position of the finger detected by the touch pad 20, i.e., the touch position itself on the input surface of the touch pad 20, is reflected as the position of the cursor 101 on the screen 100. With this position detection mode, placing a finger on the touch pad 20 makes the cursor 101 appeared on the screen 100.

The control section 5 issues a command for the display video generation section 9 based on the user operation using the touch pad 20, and goes through a display operation as will be described below, i.e., generation of a display video signal.

Described next are the basic operations with such modes, i.e., vector detection mode and position detection mode.

Vector Detection Mode

When a user touches the touch pad 20 with his or her finger and moves the finger thereon, the cursor 101 follows the movement of the finger on the screen 100, i.e., moves up, down, left and right.

When the user taps the touch pad 20, a clip corresponding to the thumbnail image TM with the cursor 101 placed thereon is reproduced.

If wanting to display any thumbnail images in the clips preceding or subsequent to the current clip, the user moves the cursor 101 to the scroll bar 106 located on the right side of the screen, and taps the up or down arrow or the scroll bar before sliding the cursor 101. This accordingly scrolls the screen display so that any wanting thumbnail images TM appear, e.g., in FIG. 5A example, the thumbnail images TM of the clips preceding to the 229th clip or those of the clips subsequent to the 240th clip.

Position Detection Mode

When a user touches the touch pad with his or her finger, the cursor 101 accordingly appears on the screen 100 at the position corresponding to the touch.

When the user taps the touch pad, a clip corresponding to the thumbnail image TM with the cursor 101 placed thereon is reproduced.

If wanting to display any thumbnail images in the clips preceding or subsequent to the current clip, the user moves the cursor 101 to the scroll bar 106 located on the right side of the screen, and taps the up or down arrow or the scroll bar before sliding the cursor 101.

That is, both in the vector detection mode and the position detection mode, the control section 5 issues a command for the display video generation section 9 to change the display position of the cursor 101 based on any direction change observed to the touch position of the touch panel 20 or based on the touch position itself so that the user is allowed to select any thumbnail image TM using the cursor 101.

Through detection of pad tapping, i.e., detection of instantaneous touch, the thumbnail image TM currently with the cursor 101 placed thereon is determined as the image being selected, and the clip of the thumbnail image TM is accordingly reproduced.

Figure 5B:
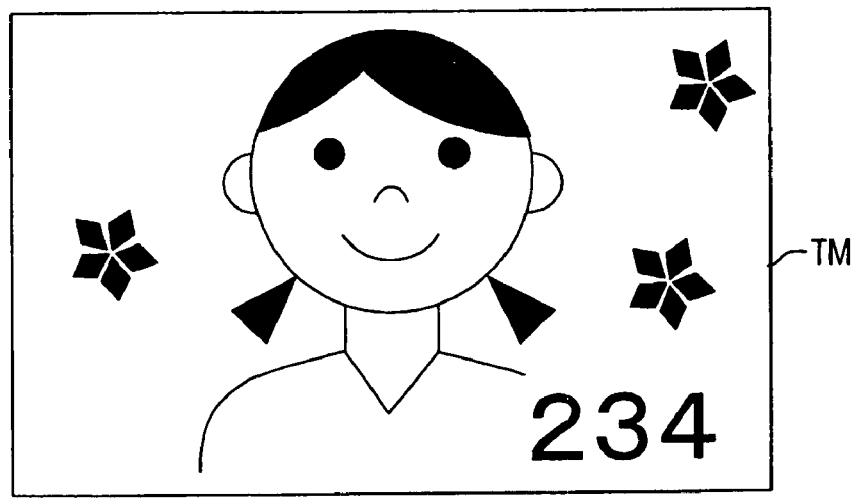

FIG. 5A shows the state that the thumbnail image TM of the 234th clip is with the cursor 101 placed thereon, and when the screen is tapped in this state, the video of the 234th clip is reproduced from the optical disk 90 as shown in FIG. 5B.

4. Extended Operation Example I

In addition to the basic operation described above, in this example, other types of operations are possible in accordance with the operation of the touch pad 20, i.e., extended operation examples I and II.

By referring to FIGS. 6A to 8, described now is the extended operation example I.

Figure 6A:
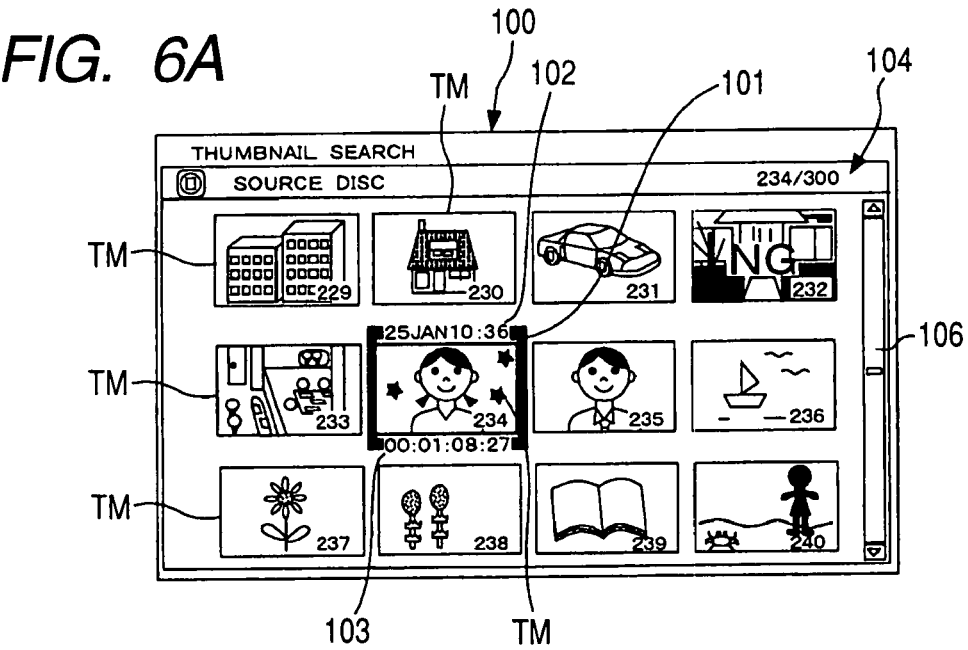
FIGS. 6A and 6B are diagrams for illustrating an extended operation example I with another list display of thumbnail images in the embodiment.
Figure 6B:
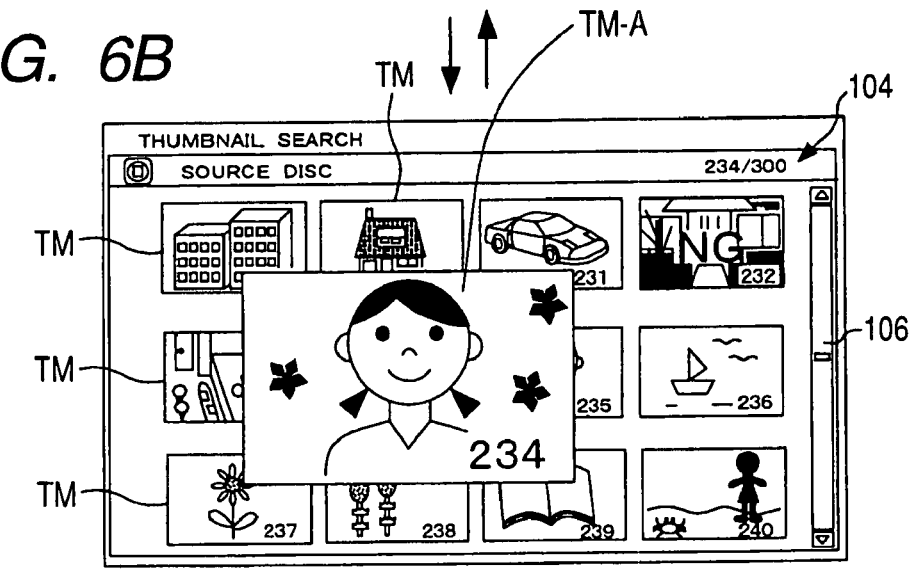

First of all, by referring to FIGS. 6A and 6B, described is an exemplary display implemented as the extended operation example I.

In the state that the screen 100 is displaying a list of thumbnail images as shown in FIG. 6A, similarly to the above, with the vector detection mode, a user touches the touch pad 20 with his or her finger and moves the finger thereon, the cursor 101 follows the movement of the finger, i.e., moves up, down, left and right. With the position detection mode, when the user touches the touch pad 20 with his or her finger, the cursor 101 accordingly appears on the screen 100 at the position corresponding to the touch.

When the user depresses the touch pad 20, the thumbnail image TM with the cursor 101 placed thereon is increased in size depending on the force of the depression. Assumed here is a case where the user depresses the touch pad 20 in the state that the cursor 101 is placed on the thumbnail image TM of the 234th clip as in FIG. 6A. In this case, as shown in FIG. 6B, the thumbnail image TM of the 234th clip is displayed as a thumbnail TM-A as a result of size increase with the scaling factor appropriate to the pressure of the depression.

When the user moves away his or her finger from the touch pad 20 in this state, the state is put back to the original, i.e., the state of FIG. 6A.

By referring to FIG. 7, described next is the procedure to be executed by the control section 5 in accordance with an operation signal SC through operation of the touch pad 20.

In step F101, the control section 5 issues a command to move the cursor 101 on the list display of thumbnail images, i.e., clip selection process. That is, after detecting information about the touch position, the control section 5 issues a command for the display video generation section 9 to move the cursor 101 on the screen 100 based on any direction change observed to the position or based on the position itself.

At the time point when the user stops the operation of touching and moving his or her finger on the input surface of the touch pad 20, i.e., when no change of touch position is detected, the cursor 101 is located on a specific thumbnail image TM on the screen of a specific clip being currently selected.

In step F102, the control section 5 determines whether the touch pad 20 is being depressed or not. That is, the control section 5 checks information about the pressure, and determines whether the pressure of depression is of a predetermined level or higher.

When the pressure of depression is of a predetermined level or higher, the procedure goes to step F103, and the control section 5 determines whether the value of the pressure is equal to or larger than the upper limit value. When the pressure is not yet reaching the upper limit value, the procedure goes to step F104. In step F104, the control section 5 issues a command for the display video generation section 9 to display a size-increased thumbnail image TM-A, i.e., the currently-selected thumbnail image TM increased in size with the scaling factor appropriate for the detected pressure.

Such a procedure from steps F102 to F104 is repeated until a determination is made in step F105 that the user's finger is moved away from the touch pad 20, i.e., no contact position information is provided any more.

Figure 8:
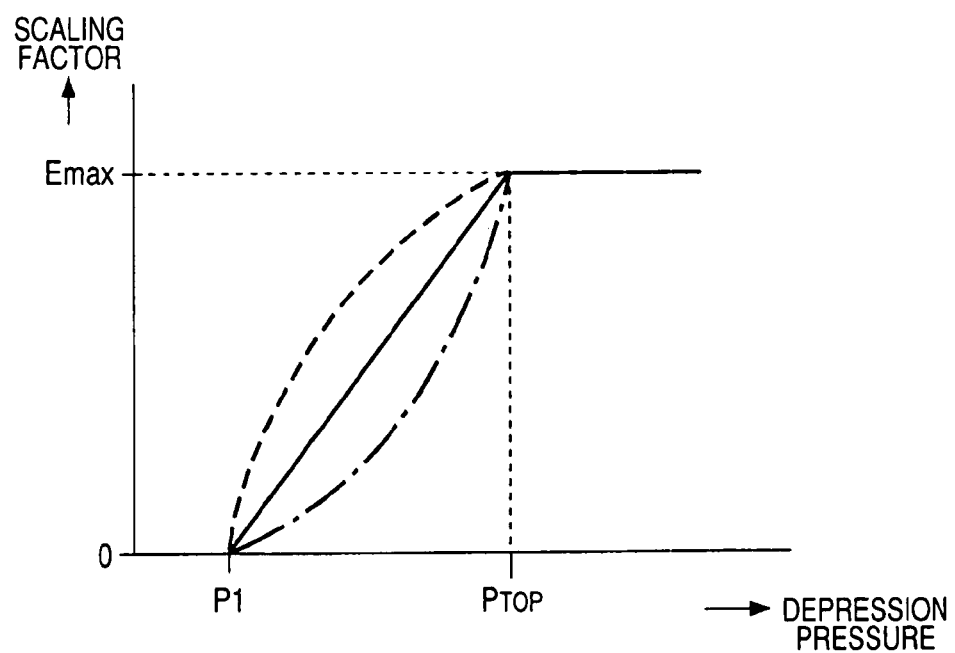
FIG. 8 is a diagram for illustrating a depression pressure and a scaling factor of the extended operation example I in the embodiment.

The control section 5 sets the scaling factor with respect to the detected pressure of depression as shown in FIG. 8. In FIG. 8, a pressure P1 is assumed as being a predetermined pressure value determined as "depression". That is, the pressure equal to or smaller in value than the pressure P1 is of a level detected when the user touches and moves his or her finger on the touch pad in the horizontal direction or taps the touch pad, for example, and the pressure of such a level is determined as not "depression".

When the pressure detected by the touch pad 20 reaches the pressure P1 or higher, the control section 5 acknowledges it as the operation of "depression", and sets the scaling factor to be appropriate for the detected pressure as indicated by the solid line. The control section 5 then notifies the display video generation section 9 of the scaling factor. As such, the harder the user depresses the touch pad, the larger the thumbnail image TM becomes.

The procedure of steps F102 to F104 is repeated until the user moves his or her finger away from the touch pad. As such, depending on the force level of the user's depression, the scaling factor is changed for the thumbnail image TM selected on the screen 100. That is, for the size-increased thumbnail image TM-A as in FIG. 6B, the larger the force to be applied, the larger the scaling factor becomes, and the smaller the force to be applied, the smaller the scaling factor becomes.

Note that when the detected pressure of depression takes a value equal to or higher than the upper limit value PTOP, the procedure goes from step F103 to F105, and the scaling factor is not increased. As such, the scaling factor does not take a value larger than the maximum possible scaling factor Emax.

Herein, the pressure of depression and the scaling factor may have the relationship as indicated by the broken line or the alternate-long-and-short-dashed line in FIG. 8.

When detecting in step F105 that the user's finger is moved away from the touch pad 20, the procedure goes to step F106, and the control section 5 puts the display back to the thumbnail image TM of original size. That is, the control section 5 issues a command for the display video generation section 9 to put the display back to the general list display of FIG. 6A.

With such an extended operation during the list display of thumbnail images, the user becomes able to select any thumbnail image TM by touching the touch panel 20 with his or her finger and moving the finger thereon, and increase the size of the selected thumbnail image TM by depressing the corresponding position on the touch panel. The user also becomes able to control the scaling factor with the force level of his or her pushing. Moreover, when the user moves away his or her finger from the touch pad, the display can be put back to the original list display.

As such, operating only the touch pad 20 enables the user to check the thumbnail images TM, i.e., video contents of the clips, more in detail. What is more, such an operation can be made intuitively.

5. Extended Operation Example II

By referring to FIGS. 9A to 11, described next is the extended operation example II.

Figure 9A:
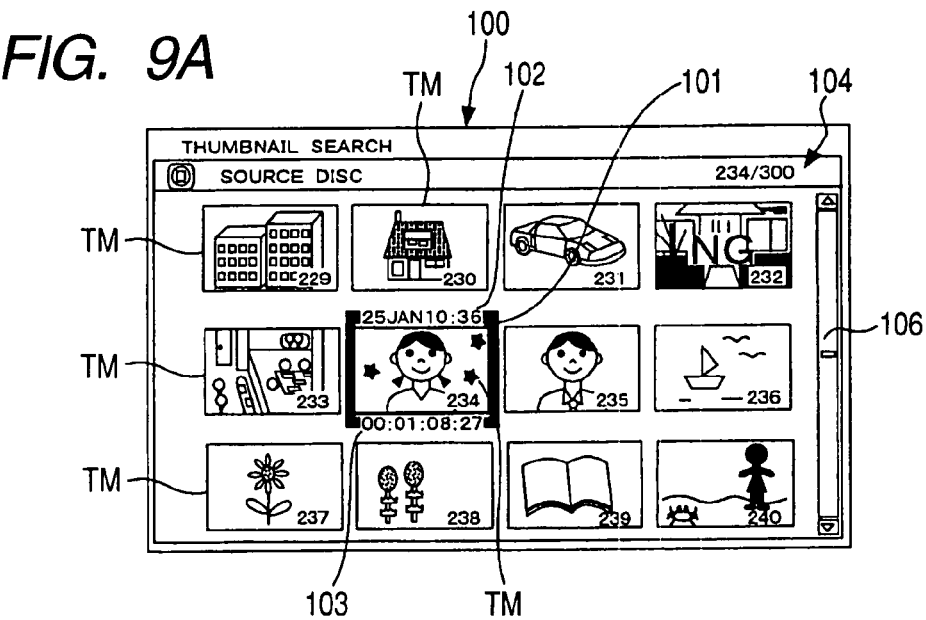
FIGS. 9A and 9B are diagrams for illustrating an extended operation example II with still another list display of thumbnail images in the embodiment.

In the state that the screen 100 is displaying a list of thumbnail images as shown in FIG. 9A, similarly to the above, with the vector detection mode, a user touches the touch pad 20 with his or her finger and moves the finger thereon, the cursor 101 follows the movement of the finger, i.e., moves up, down, left and right. With the position detection mode, when the user touches the touch pad 20 with his or her finger, the cursor 101 accordingly appears on the screen 100 at the position corresponding to the touch.

When the user depresses the touch pad 20, displayed is a screen for selecting scenes in which the clip corresponding to the thumbnail image TM where the cursor 101 places thereon is divided. Herein, the scenes are division units of a clip.

Figure 9B:
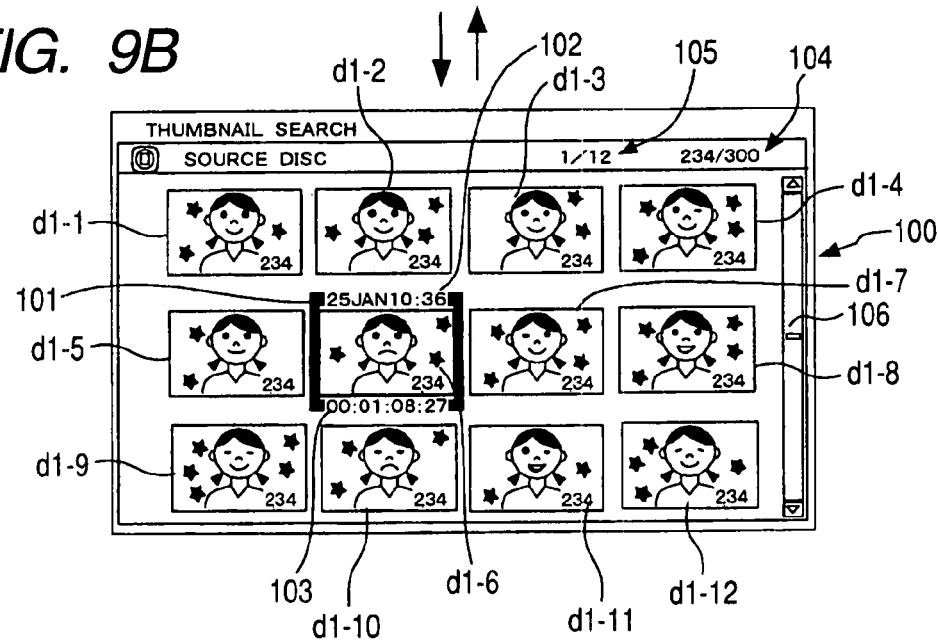

As shown in FIG. 9A, in the state that the thumbnail image TM of the 234th clip is being currently selected, when the user depresses the touch pad 20, divided thumbnail images d1-1 to d1-12 appear as FIG. 9B. These divided thumbnail images d1-1 to d1-12 are the results of dividing the 234th clip into 12 pieces. On the screen, it is preferable if a division factor display 105 is also made.

Such divided thumbnail images d1-1 to d1-12 are shown in FIG. 11B.

The divided thumbnail images d1-1 to d1-12 in FIG. 11B are those derived by generating size-reduced images for a frame in each of scenes, which are results of dividing, i.e., equally dividing, the clip CL2 into 12 scenes.

That is, with the divided thumbnail images d1-1 to d1-12, the contents of any selected clip are shown in detailed scenes.

FIG. 11B shows the divided thumbnail images d1-1 to d1-12 for each of the scenes. In this state, the user can perform a selection of scenes, i.e., divided thumbnail images, by moving the cursor 101.

Thereafter, assuming that the divided thumbnail image d1-6 is selected as FIG. 11B, when the user depresses the touch pad 20, appeared are divided thumbnail images being the results of further dividing the currently-selected scene.

For example, FIG. 11C shows divided thumbnail images d2-1 to d2-12 being the results of further dividing the scene corresponding to the divided thumbnail image d1-4, and these divided thumbnail images d2-1 to d2-12 are to be displayed in the form of a list.

In the state that such divided thumbnail images d2-1 to d2-12 are displayed, when a specific divided thumbnail image is selected and depressed, the screen accordingly displays thereon divided thumbnail images being the results of further dividing the scenes of the selected divided thumbnail image.

Such division can be continued until a scene corresponding to a divided thumbnail image has the length of a frame.

Note that, in this description, in the course of division steps, a scene selected in one step is further divided in the next step, e.g., divided thumbnail images in the first step are images as a result of dividing a clip into 12 scenes, divided thumbnail images in the second step are images as a result of dividing, into 12 scenes, one of the scenes selected from the divided thumbnail images in the first step, and divided thumbnail images in the third step are images as a result of dividing, into 12 scenes, one of the scenes selected from the divided thumbnail images in the second step. This is surely not restrictive, and any other division will also do.

As one possible division, the original clip may be divided further down in the course of division steps, e.g., the divided thumbnail images in the first step may be the images of 12 scenes as a result of clip division, the divided thumbnail images in the second step may be the images of 24 scenes as a result of another clip division, and the divided thumbnail images in the third step may be the images of 36 scenes as a result of still another clip division. Also in this case, division can be continued until a scene has the length of a frame.

In this example, such a display is continuously made in the course of division in response when the user keeps depressing the touch pad. Alternatively, the operation of putting the procedure back to one preceding division step is also possible.

For example, such depression as continuing division steps is the operation by the user to depress the touch pad with his or her finger tip.

On the other hand, when the user depresses the touch pad with his or her finger belly, it is the operation of putting the procedure back to one preceding division step. For example, with display of divided thumbnail images of the second step, i.e., d2-1 to d2-12, when a user depresses the touch pad 20 with his or her finger belly, the display is put back to the display of divided thumbnail images of the first step, i.e., d1-1 to d1-12 as FIG. 9B. When the user depresses the touch pad 20 with his or her finger belly with display of divided thumbnail images of the first step, for example, the display is put back to the list display of thumbnail images of the clips as FIG. 9A.

Moreover, when the user pushes long the touch pad with the finger belly, it is the operation of putting back the display to the list display of thumbnail images TM of the original clips.

For example, with display of divided thumbnail images of the second step, i.e., d2-1 to d2-12, when the user pushes long the touch pad 20 with the finger belly, the display is put back to the list display of thumbnail images of the clips as FIG. 9A.

Figure 10:
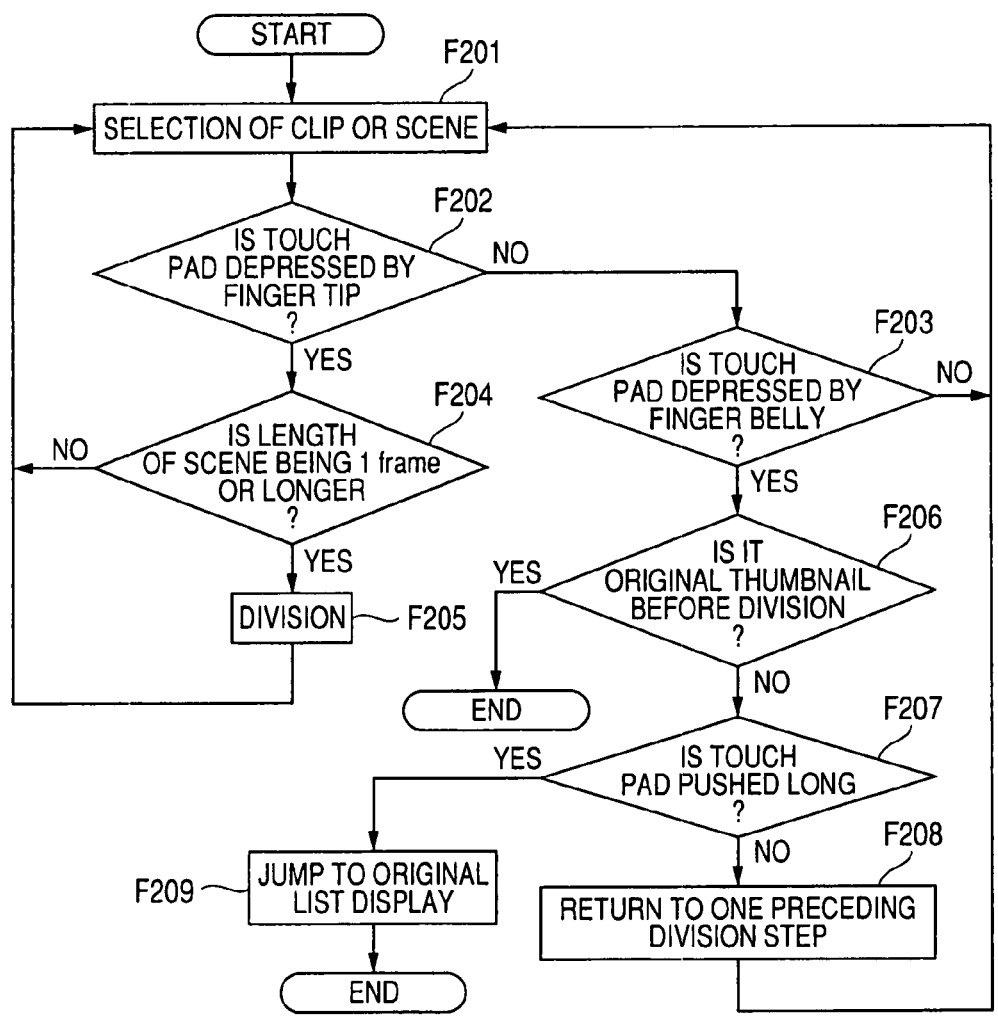
FIG. 10 is a flowchart of the extended operation example II in the embodiment.

FIG. 10 shows the procedure to be executed by the control section 5 in accordance with the operation signal SC through operation of the touch pad 20.

In step F201, the control section 5 issues a command to move the cursor 101 on the list display of thumbnail images, i.e., clip selection process. That is, after detecting information about the touch position, the control section 5 issues a command for the display video generation section 9 to move the cursor 101 on the screen 100 based on any direction change observed to the position or based on the position itself.

At the time point when the user stops the operation of touching and moving his or her finger on the input surface of the touch pad 20, i.e., when no change of touch position is detected, the cursor 101 is located on a specific thumbnail image TM on the screen of a specific clip being currently selected.

In step F202, the control section 5 detects whether the touch pad 20 is being depressed by the finger tip or not based on a pressure determination signal and a touch area determination signal. In step F203, the control section 5 detects whether the touch pad 20 is being depressed by the finger belly or not based also on the determination signals as above.

When detecting that the touch pad 20 is being depressed by the finger tip, the procedure goes from step F202 to F204, and the control section 5 determines whether a scene has the length of a frame as a result of division. When a scene has the length of a frame as a result of division, it means that the scene cannot be divided further, and thus the procedure returns to step F201 with no more division. When a scene does not yet have the length of a frame, the procedure goes to step F205, and the control section 5 issues a command for the display video generation section 9 to display divided thumbnails being the results of further division in the next step. The procedure then returns to step F201.

When the touch pad 20 is depressed by the finger tip in the state of FIG. 9A, for example, with the process in step F205, display of divided thumbnails d1-1 to d1-12 of the first step is made as FIG. 9B. Moreover, when the touch pad 20 is depressed by the finger tip in the state of FIG. 9B, for example, with the process in step F205, display of divided thumbnails d2-1 to d2-12 being the results of further division in the second step is made.

When detecting that the touch pad 20 is being depressed by the finger belly, the procedure goes from F203 to F206, and the control section 5 determines whether the current display is of the thumbnail images TM each being the source of division as shown in FIG. 9A. Such depression by the finger belly is the operation of putting the procedure back to the preceding division step as described above. However, with display of the thumbnail images TM each being the source of division as shown in FIG. 9A, the state cannot be put back any more so that this is the end of the procedure. In this case, alternatively, the list display of thumbnail images TM may be ended.

If the display is not of the thumbnail images TM each being the source of division but of the divided thumbnail images in a specific step, the procedure goes to step F207, and the control section 5 determines whether the touch pad 20 is being pushed long.

When the touch pad 20 is not being pushed long, the procedure goes to step F208, and the control section 5 issues a command for the display video generation section 9 to put the procedure back to the preceding division step.

When the user depresses the touch pad 20 with his or her finger belly with display of the divided thumbnail images of the second step, i.e., d2-1 to d2-12, with the process of step F208, the display is put back to the display of divided thumbnail images of the first step as shown in FIG. 9B, i.e., d1-1 to d1-12. When the user depresses the touch pad 20 with his or her finger belly with display of the divided thumbnail images of the first step as FIG. 9B, with the process of step F208, the display is put back to the display of thumbnail images of the clips as shown in FIG. 9A.

When the determination result in step F207 tells that the touch pad is pushed long, the procedure goes to step F209, and the control section 5 issues a command for the display video generation section 9 to put the display back to the list display of the original thumbnail images TM as FIG. 9A irrespective of which division step. When the user pushes long the touch pad 20 with his or her finger belly with display of the divided thumbnail images of the second step, i.e., d2-1 to d2-12, for example, with the process of step F209, the display is put back to the list display of the thumbnail images of the clips as FIG. 9A.

With such an extended operation during the list display of thumbnail images, the user becomes able to select any thumbnail image TM by touching the touch pad 20 with his or her finger and moving the finger thereon. The user also becomes able to display divided thumbnail images of the scenes as a result of dividing any selected clip by depressing the thumbnail image TM with the finger tip, and to display the divided thumbnail images being the results of further division.

Moreover, when the user depresses the touch pad with the finger belly, the procedure can be put back to the preceding division step.

Furthermore, when the user presses long the touch pad with the finger belly, irrespective of which division step, the display can be put back to the list display of the original thumbnail images TM.

As such, operating only the touch pad 20 enables the user to check the thumbnail images TM, i.e., video contents of the clips, more in detail. What is more, such an operation can be made intuitively.

Figure 7:
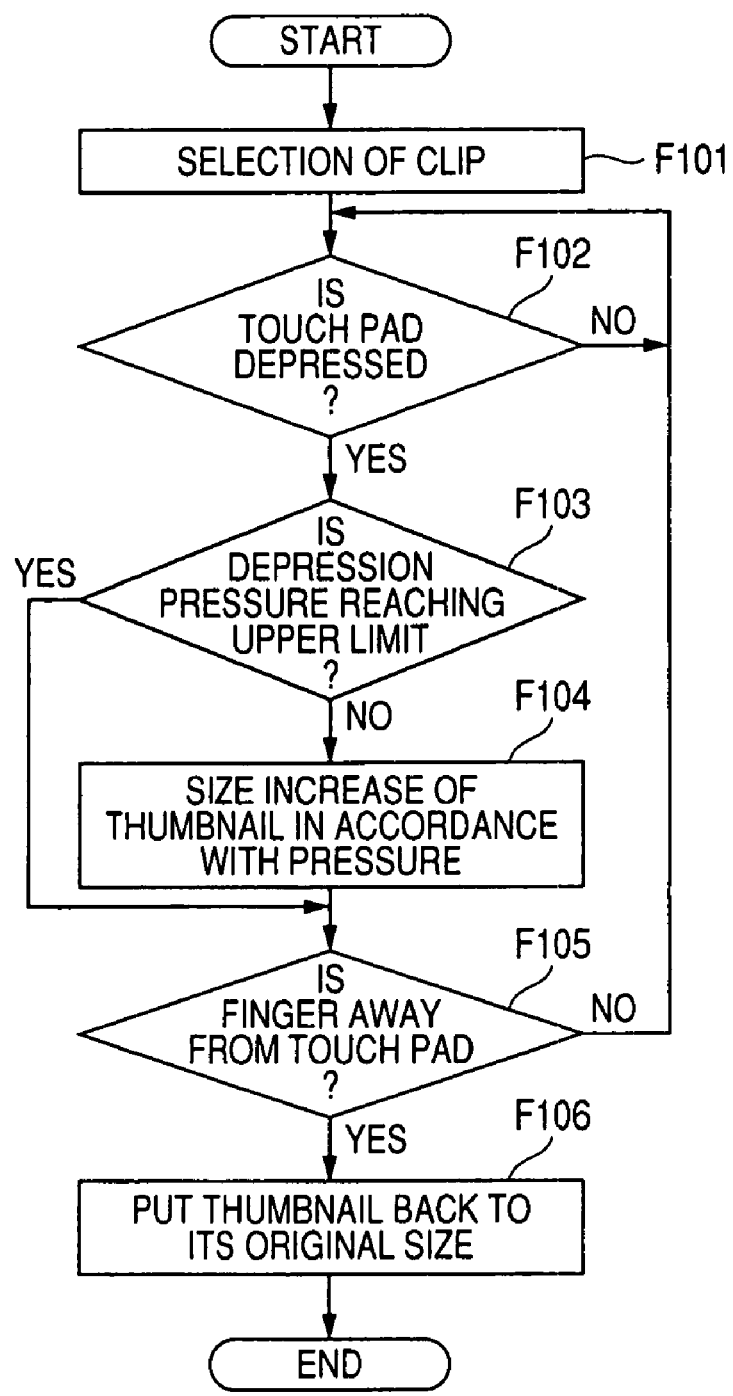
FIG. 7 is a flowchart of the extended operation example I in the embodiment.

As such, the embodiments of the invention is described, but various other modified examples are possible for the configuration of the recording and reproducing device 1, and the procedures of FIGS. 7 and 10.

Described above is the list display of thumbnail images, but this is surely not restrictive, and the invention is applicable as a preferable operation especially with display of a plurality of images.

The invention is also applicable to a recording and reproducing device using a recording medium other than the optical disk 90. As the video signal output device of the embodiment of the invention, the possible options include a recording and reproducing device using a memory card such as flash memory, and a recording and reproducing device using an HDD (Hard Disk Drive) as a recording medium, for example.

Moreover, the video signal output device of the embodiment of the invention is not restrictive to a reproduction device performing reproduction with respect to a recording medium, and is applicable to various types of devices such as tuner device and information processing device for acquiring video data over network communications as long as the devices perform video signal output for display use with respect to a monitor display device.

It should be understood by those skilled in the art that various modifications, combinations, sub-combinations and alterations may occur depending on design requirements and other factors insofar as they are within the scope of the appended claims or the equivalents thereof.

What is claimed is:

1. A video signal output device, comprising:
   a video signal generation section that generates an output video signal for screen display;
   an operation input section that detects a physical touch position and a pressure with respect to a user's finger on an input surface, and in accordance with a detection result, generates information about the touch position and information about the pressure for use each as an operation signal; and
   a control section that controls, in accordance with the operation signals coming from the operation input section, the video signal generation section to change display contents of the output video signal,
   wherein
   while the video signal generation section is generating the output video signal for list display of a plurality of images, the control section processes the information about the touch position as the operation signal for image selection, and processes the information about the pressure as the operation signal related to any of the images being a result of selection, and
   the control section determines one or both of (i) whether the input surface is being depressed by a tip of the user's finger and (ii) whether the input surface is being depressed by a belly of the user's finger, and
   when a determination result indicates that the input surface is being depressed by the tip of the user's finger, the control section determines whether a selected image from the list display can be divided into a plurality of divided images, and when it is determined that the selected image can be divided the control section causes the selected image to be divided into the plurality of divided images, and when a determination result indicates that the input surface is being depressed by the belly of the user's finger, the control section determines whether the selected image is an original image of the list display, and when it is determined that the selected image is not the original image of the list display the control section causes the selected image to be changed to either a preceding image or the original image.

2. The video signal output device according to claim 1, wherein while the video signal generation section is generating the output video signal for list display of a plurality of images, the control section processes the information about the pressure as the operation signal for a command of increasing a size of the image being the result of selection.

3. An operation input processing method, comprising the steps of:

detecting a physical touch position and a pressure with respect to a user's finger on an input surface of an operation input section;

processing information about the touch position for use as an operation signal for image selection on a screen on which a plurality of images are displayed in the form of a list;

processing information about the pressure for use as another operation signal related to any of the images being a result of selection; and determining one or both of (i) whether the input surface is being depressed by a tip of the user's finger and (ii) whether the input surface is being depressed by a belly of the user's finger, and when a determination result indicates that the input surface is being depressed by the tip of the user's finger, determining whether a selected image from the list display can be divided into a plurality of divided images, and when it is determined that the selected image can be divided causing the selected image to be divided into the plurality of divided images, and when a determination result indicates that the input surface is being depressed by the belly of the user's finger, determining whether the selected image is an original image of the list display, and when it is determined that the selected image is not the original image of the list display causing the selected image to be changed to either a preceding image or the original image.

* * * * *